(12) United States Patent
Matsuoka

(10) Patent No.: US 9,676,410 B2
(45) Date of Patent: Jun. 13, 2017

(54) STOP CONTROL DEVICE OF VEHICLE

(71) Applicant: Daisuke Matsuoka, Iwata (JP)

(72) Inventor: Daisuke Matsuoka, Iwata (JP)

(73) Assignee: NTN CORPORATION, Osaka (JP)

(*) Notice: Subject to any disclaimer, the term of this patent is extended or adjusted under 35 U.S.C. 154(b) by 0 days.

(21) Appl. No.: 14/945,870

(22) Filed: Nov. 19, 2015

(65) Prior Publication Data

US 2016/0068183 A1    Mar. 10, 2016

Related U.S. Application Data

(63) Continuation of application No. PCT/JP2014/063552, filed on May 22, 2014.

(30) Foreign Application Priority Data

May 31, 2013   (JP) .................................. 2013-114949

(51) Int. Cl.
    B62D 7/15    (2006.01)
    B62D 15/02    (2006.01)
    (Continued)

(52) U.S. Cl.
CPC ........ B62D 7/1509 (2013.01); B60L 11/1803 (2013.01); B60L 15/025 (2013.01); B60L 15/2036 (2013.01); B62D 15/027 (2013.01); B62D 17/00 (2013.01); B60L 2220/44 (2013.01); B60L 2240/423 (2013.01); B60L 2250/24 (2013.01); B60L 2250/26 (2013.01);
(Continued)

(58) Field of Classification Search
None
See application file for complete search history.

(56) References Cited

U.S. PATENT DOCUMENTS 7,975,786 B2    7/2011    Ishii et al.
9,145,167 B2    9/2015    Onaya et al.
(Continued)

FOREIGN PATENT DOCUMENTS

CN    101559727 A    10/2009
CN    101918265 A    12/2010
(Continued)

OTHER PUBLICATIONS

International Search Report mailed Aug. 19, 2014, in corresponding International Application No. PCT/JP2014/063552.
(Continued)

*Primary Examiner* — Russell Frejd

(57) ABSTRACT

A vehicle stop control device is provided which prevents, when a traveling mode is switched, unintended movement of a vehicle in which all wheels are capable of being independently turned, and which can travel in a non-normal mode. Provided is: traveling mode switching section which can switch among a lateral movement mode, a pinwheeling mode, a normal traveling mode, and a parking mode, as a control mode for selecting operation combined by turning devices and traveling drive mechanisms; and turning timing shift part configured to shift the timing for turning at least one of all the wheels relative to the timing for turning the other ones of the wheels at the time of mode switching by the traveling mode switching section.

5 Claims, 6 Drawing Sheets

(51) Int. Cl.
*B62D 17/00* (2006.01)
*B60L 15/02* (2006.01)
*B60L 15/20* (2006.01)
*B60L 11/18* (2006.01)

(52) U.S. Cl.
CPC .......... *B60L 2260/28* (2013.01); *Y02T 10/643* (2013.01); *Y02T 10/7005* (2013.01); *Y02T 10/72* (2013.01); *Y02T 10/7275* (2013.01)

(56) References Cited

U.S. PATENT DOCUMENTS

| | | | |
|---|---|---|---|
| 2001/0032748 A1* | 10/2001 | Demerly | B60T 8/1755 180/402 |
| 2005/0236217 A1 | 10/2005 | Koelin et al. | |
| 2009/0178876 A1* | 7/2009 | Miki | B62D 7/142 180/411 |
| 2009/0260901 A1 | 10/2009 | Ishii et al. | |
| 2011/0046851 A1 | 2/2011 | Onaya et al. | |
| 2012/0046835 A1 | 2/2012 | Matsumoto et al. | |
| 2014/0305715 A1 | 10/2014 | Makino et al. | |

FOREIGN PATENT DOCUMENTS

| | | | |
|---|---|---|---|
| JP | 2007-99209 | | 4/2007 |
| JP | 2007-145253 | | 6/2007 |
| JP | 2007-237838 | | 9/2007 |
| JP | 2007-302218 | | 11/2007 |
| JP | 2007 302218 A | * | 11/2007 |
| JP | 2008-13045 | | 1/2008 |
| JP | 4541201 | | 9/2010 |
| JP | 2013-112102 | | 6/2013 |
| JP | 2013-112103 | | 6/2013 |

OTHER PUBLICATIONS

Chinese Office Action dated Sep. 2, 2016 in corresponding Chinese Patent Application No. 201480030319.7.
PCT International Preliminary Report on Patentability dated Dec. 10, 2015 in corresponding International Patent Application No. PCT/JP2014/063552, pp. 1-5.
Extended European Search Report dated Feb. 6, 2017 in corresponding European Patent Application No. 14804087.6.
Japanese Office Action dated Dec. 6, 2016 in corresponding Japanese Patent Application No. 2013-114949.

* cited by examiner

STOP CONTROL DEVICE OF VEHICLE

CROSS REFERENCE TO THE RELATED APPLICATION

This application is a continuation application, under 35 U.S.C. §111(a), of international application No. PCT/JP2014/063552, filed May 22, 2014, which is based on and claims Convention priority to Japanese patent application No. 2013-114949, filed May 31, 2013, the entire disclosure of which is herein incorporated by reference as a part of this application.

BACKGROUND OF THE INVENTION

Field of the Invention

The present invention relates to a vehicle stop control device configured to prevent unintended backward movement or the like of a vehicle in which all wheels are capable of being independently turned and driven wheels are capable of being independently driven to travel.

Description of Related Art

Electric cars or the like in which all wheels are capable of being independently turned and driven wheels are capable of being independently driven to travel, have been suggested. Such cars can move in a special mode, i.e., non-normal or unusual mode, in which conventional cars cannot move. The special or non-normal mode includes, for example, pinwheeling that allows a vehicle body to be turned or pinwheeled about the center thereof, and lateral movement that allows the vehicle body to be moved directly sideways. Therefore, garaging, movement to a parking space, or direction change in a narrow space or road, can be freely performed (Patent Document 1).

RELATED DOCUMENT

Patent Document

[Patent Document 1] JP Patent No. 4541201

In the car that can travel in the non-normal mode, it is difficult to perform driving operation for the pinwheeling, the lateral movement, or the like, by operating a steering wheel and an accelerator pedal. Further, it is sometimes difficult to perform appropriate driving operation according to the situation, by automatic driving operation by means of dedicated buttons operation.

Therefore, the applicant of the present invention suggests a technique providing traveling mode switching section which is capable of switching among a lateral movement mode, a pinwheeling mode, and a normal traveling mode, as a control mode for selecting operation combined by means of a turning device and a traveling drive mechanism (Japanese Patent Application No. 2011-258656, Japanese Patent Application No. 2011-258657). However, when the traveling mode switching section switches the mode, there may be a case where all wheels are oriented in the same direction, that is, parallel to each other. Therefore, when a vehicle performs switching of the mode on a slope or the like, unintended backward movement or the like of the vehicle may occur due to the inclination of a slope. If the mode is switched in a state where the brake is applied, load on a worm gear is increased.

SUMMARY OF THE INVENTION

An object of the present invention is to provide a vehicle stop control device configured to prevent, when a traveling mode is switched, unintended movement of a vehicle in which all wheels are capable of being independently turned, and which can travel in a non-normal mode.

Hereinafter, the present invention will be described with reference to reference numerals used in embodiments for the sake of facilitating the understanding.

A vehicle stop control device according to the present invention performs stop control for a vehicle including four or more wheels 1, 2 and turning devices 4 capable of independent turning of the wheels 1, 2, the wheels 1, 2 having driven wheels being independently driven to travel by respective traveling drive mechanisms 5 with motors, and the vehicle stop control device comprises, as a control mode for selecting operations combined by the turning devices 4 and the traveling drive mechanisms 5:

a lateral movement mode in which each wheel 1, 2 is laterally oriented with respect to a front-rear direction of the vehicle, and each driven wheel is rotated so as to roll in a same lateral direction;

a pinwheeling mode in which the wheels 1, 2 are oriented in a direction along a common circumference, or in a direction along any of circumferences of a plurality of concentric circles, and each driven wheel is rotated in a same direction when seen from a center of a vehicle body;

a normal traveling mode in which driving operation for normal traveling other than driving operation in the lateral movement mode or the pinwheeling mode is performed; and a parking mode in which the vehicle is stopped.

The vehicle stop control device further comprises:

a traveling mode switching section 41 capable of switching between the modes; and a turning timing shift part 32c configured to shift timing for turning at least one of all the wheels 1, 2 relative to timing for turning the other ones of all the wheels at a time of mode switching by the traveling mode switching section 41.

In this configuration, the mode is switched among the lateral movement mode, the pinwheeling mode, the normal traveling mode, and the parking mode by the traveling mode switching section 41. For example, after the vehicle has reached a destination in the normal traveling mode, a driver operates the traveling mode switching section 41, whereby the mode can be switched to the lateral movement mode or the pinwheeling mode. Thus, garaging, movement to a parking space, direction change in a narrow space or the like can be performed easily. Therefore, with the operation of the traveling mode switching section 41, the traveling mode can be switched. When the mode is switched by the traveling mode switching section 41, the turning timing shift part 32c shifts the timing for turning at least one of all the wheels 1, 2 relative to the timing for turning the other wheels. At the time of mode switching, a plurality of wheels 1, 2 to be turned are not simultaneously turned, but the timing for turning at least one of the plurality of wheels 1, 2 is shifted, whereby a frictional force constantly acts between a road surface and any of the wheels 1, 2 at the time of mode switching. Thus, unintended movement of the vehicle due to disturbance such as an inclination can be prevented. Therefore, unintended movement of the vehicle at the time of switching the traveling mode can be prevented.

The turning timing shift part 32c may shift timing for turning front wheels 1 relative to timing for turning rear wheels 2. For example, when the mode is switched from the lateral movement mode to the parking mode, the turning timing shift part 32c causes the turning devices 4 to perform turning so as to delay the timing for turning the left and right front wheels 1, 1 relative to the timing for turning the left and right rear wheels 2, 2. Thus, at the time of mode switching, the turning timing is shifted such that the front and rear wheels 1, 2 do not become parallel to each other simultaneously, whereby unintended movement of the vehicle on a slope or the like can be prevented.

The turning timing shift part 32c may shift timing for turning front and rear right wheels 1, 2 relative to timing for turning front and rear left wheels 1, 2. For example, when the mode is switched from the lateral movement mode to the parking mode, the turning timing shift part 32c causes the turning devices 4 to perform turning so as to delay the timing for turning the front and rear right wheels 1, 2 relative to the timing for turning the front and rear left wheels 1, 2. Thus, unintended movement of the vehicle on a slope or the like can be prevented. The turning timing shift part 32c may shift the timing for turning all the wheels 1, 2.

A stopped-state turning control part 32b may be provided which is configured to cause the turning devices 4 to turn one or more of the wheels 1, 2 toward a toe-in or toe-out side by an amount greater than a defined turning amount command value, to perform hill hold of the vehicle, after mode switching by the traveling mode switching section 41. On a slope or the like, unintended movement of the vehicle may occur even after the mode has been switched. With this configuration, after the mode switching, the stopped-state turning control part 32b causes the respective turning devices 4 corresponding to one or more wheels 1, 2 to turn the one or more wheels 1, 2 toward a toe-in or toe-out side by an amount greater than a defined turning amount command value. A frictional force between a road surface and the turned wheels can prevent unintended movement of the vehicle.

The motors 6 may have inputted alternating current. Each traveling drive mechanism 5 may be an in-wheel motor drive device. Each of the motors 6 may have a speed reducer. Each of the driven wheels may be driven to travel by an onboard drive device including the motor 6.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
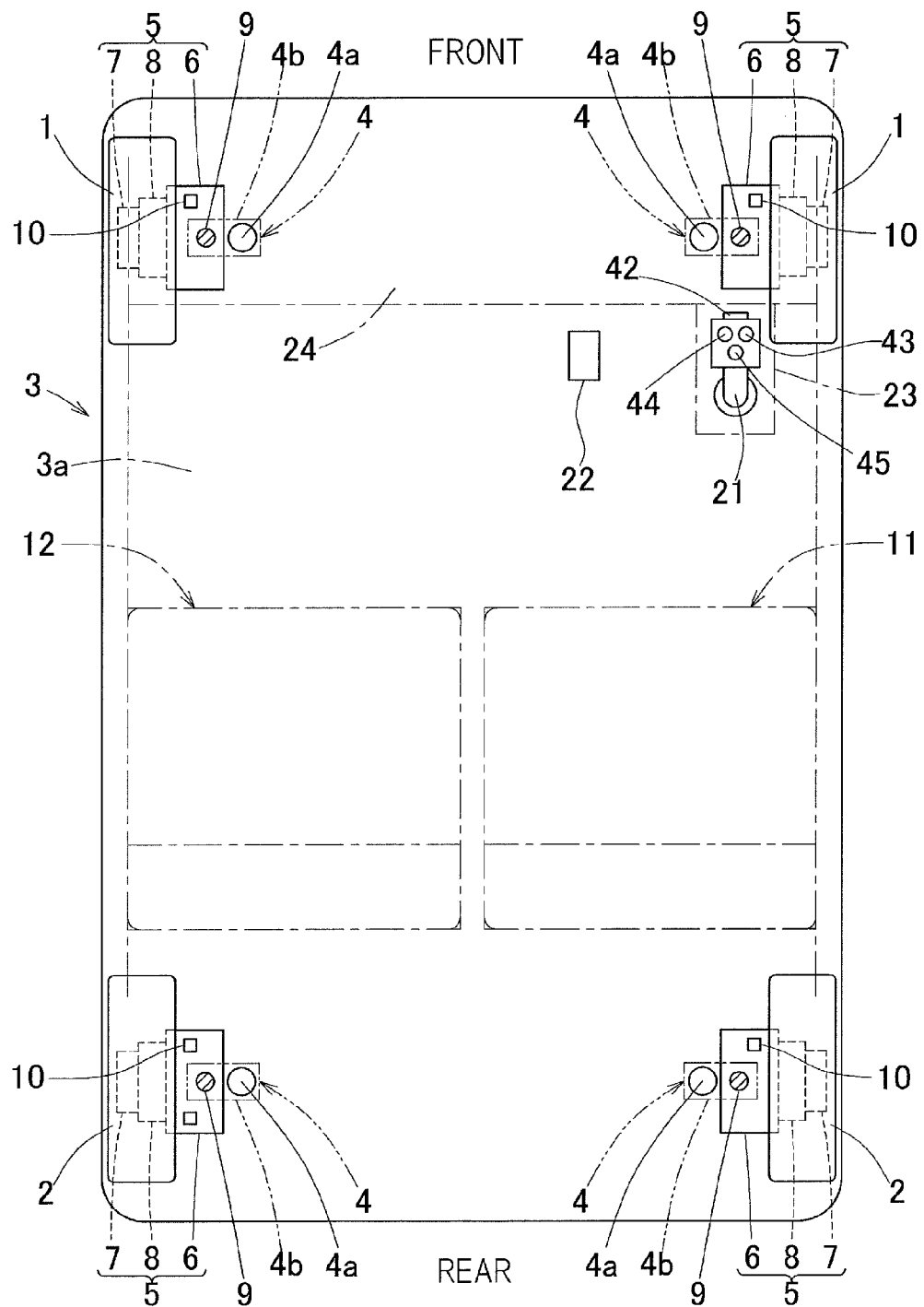
FIG. 1 is an explanatory plan view illustrating the arrangement of various parts of a vehicle according to a first embodiment of the present invention.

A first embodiment of the present invention will be described with reference to FIG. 1 to FIG. 6. A vehicle according to the present embodiment is an electric car which has two left and right wheels 1, 1 serving as front wheels and two left and right wheels 2, 2 serving as rear wheels. All the wheels 1, 2 each include a turning device 4 which allows independent turning of its corresponding wheel. In an illustrated example, the wheels 1, 2 are all driven wheels that are each independently driven to travel by a traveling drive mechanism 5 that includes a drive source 6.

In this example, the traveling drive mechanism 5 is an in-wheel motor drive device including a wheel bearing 7 supporting the corresponding wheel 1, 2, a motor 6 serving as a drive source, and a speed reducer or reduction gear 8 for reducing the speed of the rotation outputted from the motor 6 and for transmitting the rotation to a rotational bearing ring (not shown) of the wheel bearing 7. The traveling drive mechanism 5 is an integrated unit in which the wheel bearing 7, the motor 6, and the speed reducer 8 are provided in a common housing, or in which these components are coupled to each other. The integrated traveling drive mechanism 5 is provided via a suspension (not shown) in a vehicle body 3 so as to be rotatable about a vertically extending support shaft 9. The motor 6 includes a rotation angle sensor 10 that outputs a rotation angle signal of a rotor (not shown) of the motor. An inverter device, which will be described later, acquires the rotation angle signal from the rotation angle sensor 10, and performs control such as vector control according to the rotation angle.

The turning device 4 includes a turning drive source 4a including an electric motor or the like, and a transmission mechanism 4b for transmitting the rotation of the turning drive source 4a to the traveling drive mechanism 5. The transmission mechanism 4b includes a gear train, for example. The turning device 4 of this example uses a steer-by-wire system that is not mechanically linked with a joystick 21 serving as steering input portion or input element. Apart from this, the transmission mechanism 4b may be a combination between gears and a rotation-rectilinear motion conversion assembly such as ball screws or a rack-pinion mechanism.

Figure 3A:
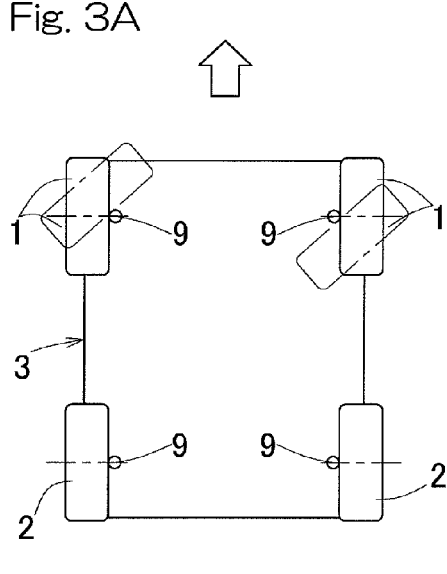
FIGS. 3A-3D are explanatory plan views illustrating operations in a normal traveling mode, a pinwheeling mode, a lateral movement mode, and a parking mode of the vehicle, respectively.
Figure 3B:
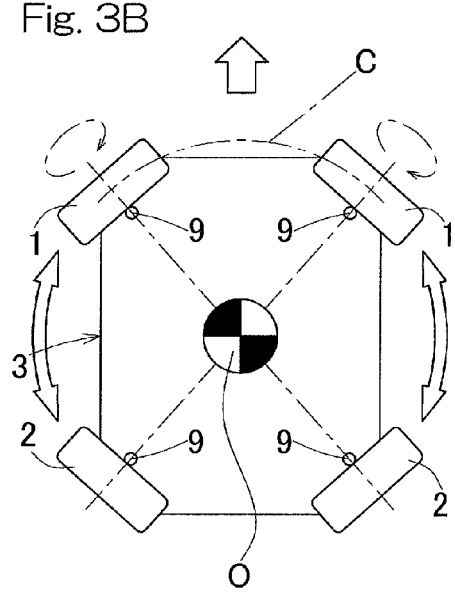
Figure 3C:
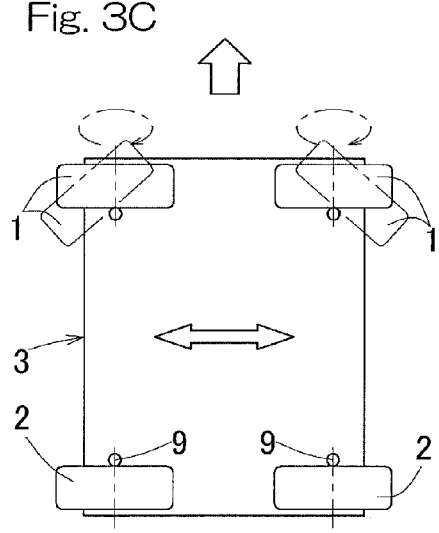

This electric car can move in a normal traveling mode shown in FIG. 3A and a non-normal traveling mode, which is a pinwheeling mode in FIG. 3B or a lateral movement mode shown in FIG. 3C, by a configuration in which all the wheels 1, 2 each include the turning device 4 for allowing independent turning of its corresponding wheel, and a configuration in which all the driven wheels 1, 2 are each capable of being independently driven. Further, the electric car can be in a parking mode shown in FIG. 3D. The normal traveling mode shown in FIG. 3A includes normal straight traveling and traveling in the direction of an arc-shaped curve, and is a traveling mode other than the non-normal traveling modes which are the pinwheeling mode and the lateral movement mode described below. In the normal traveling mode, the left and right wheels 1, 2 are turned in the same direction.

The pinwheeling mode shown in FIG. 3B is a movement mode in which the vehicle body 3 is turned there or pinwheeled about substantially the center thereof as the center of rotation (with the radius of the gyration being substantially zero). Specifically, the pinwheeling mode is a movement mode in which the wheels 1, 2 are aligned in a direction along a common imaginary circumference C, that is, in the tangential direction, and the wheels 1, 2 are driven to be rotated in the same direction when seen from the center O of the circumference, as indicated by arrows in the drawing. Accordingly, the left and right wheels 1, 2 are turned from the straight traveling direction to opposite directions to each other. In the pinwheeling mode, the wheels 1, 2 that are driven wheels can be rotated either leftward or rightward by switching the rotational direction between forward direction and reverse direction.

The lateral movement mode shown in FIG. 3C is a movement mode in which the vehicle body 3 is moved directly sideways or substantially directly sideways. Specifically, the lateral movement mode is a mode in which the wheels 1, 2 are laterally oriented with respect to the vehicle body 3, and the wheels 1, 2 serving as the driven wheels are rotated so as to roll in the same lateral direction. The operation of changing the mode from the straight traveling state in the normal traveling mode to the lateral movement mode may vary depending on the configuration of the turning device 4. In this example, the wheels 1, 1 are oriented directly sideways, rather than by simply increasing the turning angle, but by turning the left and right wheels 1, 1 in opposite directions such that they are line-symmetrical with each other, as a state in the process of turning shown in FIG. 3C by rounded rectangles indicated by single dotted line for the wheels 1 on the front side. The same applies to the wheels 2, 2 on the rear side. In a case of causing the wheels 1, 2 to turn to move the vehicle body 3 sideways, in order to rotate the wheels 1, 2 so as to roll in the same lateral direction, the left and right wheels 1, 1 are driven to be rotated in opposite directions to each other, and the left and right wheels 2, 2 are driven to be rotated in opposite directions to each other, whereby the wheels 1, 2 serving as the respective driven wheels are rotated to roll in the same lateral direction.

Figure 3D:
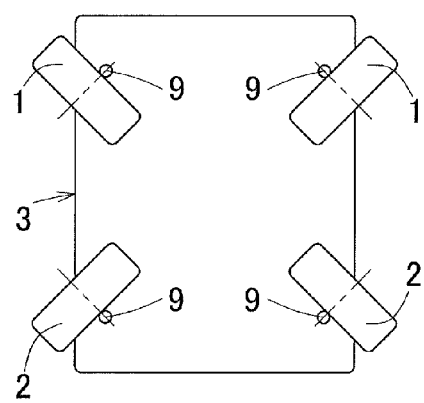

As shown in FIG. 3D, in the parking mode, the vehicle is stopped at a turning angle such that the left and right wheels 1, 1 serving as the front wheels are open to the forward, and at a turning angle such that the left and right wheels 2, 2 serving as the rear wheels are open to the rearward. For example, each of the turning angles may be about 45°, or be an angle such that the wheels 1, 2 are oriented radially from the center of the vehicle body 3 as the radial center. In this case, the front and rear wheels 1, 2 are at turning angles such that the front wheels are bilaterally symmetric and the rear wheels are bilaterally symmetric. Thus, parking at such turning angles that causes the front wheels 1 and the rear wheels 2 to be bilaterally symmetric respectively prevents unintended movement of the parked vehicle on a slope of a road surface or the like.

Referring to FIG. 1, a driving operation system will be described. In a compartment 3a of the vehicle body 3, seats serving as a driver's seat 11 and a passenger seat 12 are provided. As the driving operation system, the joystick 21 that concurrently serves as a steering input portion and an accelerator operation portion, and a brake operation element 22 are provided. For example, the brake operation element 22 includes a brake pedal or the like, and is provided on the floor in front of the driver's seat 11.

Figure 4A:
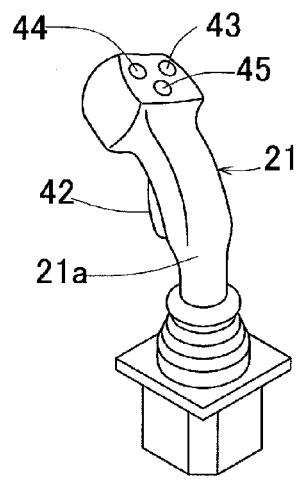
FIGS. 4A and 4B show an example of a joystick in a perspective view, and in a diagram illustrating an operation of the joystick, respectively.
Figure 4B:
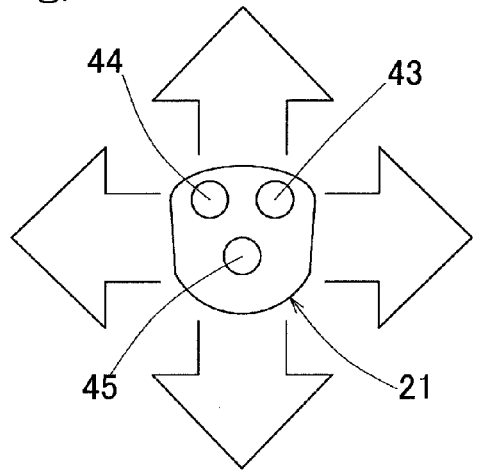

FIG. 4A is a perspective view of an example of the joystick, and FIG. 4B illustrates an operation of the joystick. As shown in FIGS. 4A and 4B, the joystick 21 is a generic term for input operation portion for allowing input of both a turning direction and an operation amount, by means of a single operation element manipulated by the driver. For example, a lever-type joystick 21 as shown in FIG. 4A may be adopted. In the joystick 21, a lever 21a serving as an operation element can be tilted in any direction in 360° around the entire circumference, from an upright state which represents a neutral position. A function represented by the direction in which the lever 21a is tilted in the accelerator operation and the turning operation varies according to the traveling mode as indicated below.

In the case of the normal traveling mode:

The front-rear direction operation of the joystick 21 gives an accelerator operation amount. The operation amount is proportional to an angle (hereinafter, referred to as a tilt angle) by which the lever 21a is tilted.

The lateral direction operation of the joystick 21 gives a steering amount of a steering handle. The steering amount is proportional to the tilt angle.

When the joystick 21 is tilted farthest in the direction toward the middle between one o'clock and two o'clock on the face of a clock, for example, the torque in the forward direction is the largest (for example, a total torque on the four wheels is 400 Nm), and the turning angle is also the largest (for example, 60°).

In the case of the pinwheeling mode:

The front-rear direction operation of the joystick 21 causes No reaction.

The lateral direction operation of the joystick 21 corresponds to an accelerator operation amount. The operation amount is proportional to the tilt angle.

When the joystick 21 is tilted farthest in the direction of three o'clock, for example, the torque for the vehicle to turn right is the largest (for example, a total torque on the four wheels is 400 Nm).

In the case of the lateral movement mode:

The front-rear direction operation of the joystick 21 causes No reaction.

The lateral direction operation of the joystick 21 corresponds to an accelerator operation amount. The operation amount is proportional to the tilt angle.

When the joystick 21 is tilted farthest in the direction of three o'clock, for example, the torque for the rightward movement is the largest (for example, a total torque on the four wheels is 400 Nm).

In the case of the parking mode:

The front-rear direction operation of the joystick 21 causes No reaction.

The lateral direction operation of the joystick 21 causes No reaction.

Figure 2:
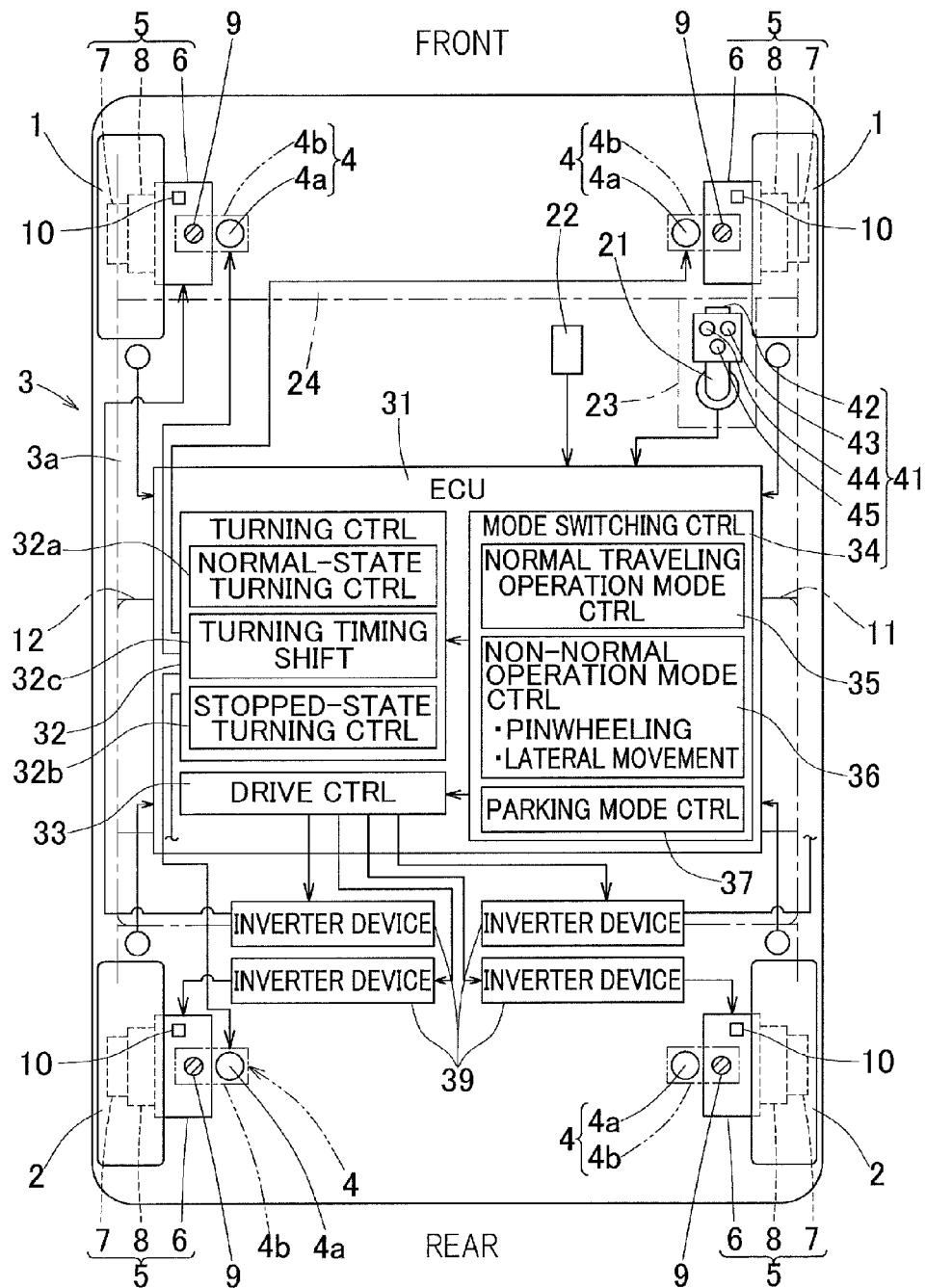
FIG. 2 is an explanatory view in which a block diagram of a control system is superimposed or overlaid on FIG. 1.

Traveling mode switching section 41 for allowing the traveling modes described with reference to FIGS. 3A-3D to be switched by the operation of the driver is provided. As shown in FIG. 2, the traveling mode switching section 41 includes a plurality of input operation portions 42 to 45 and a mode switching control unit 34 provided in an ECU 31. Of the input operation portions 42 to 45, the first input operation portion 42 provides a switching preparation mode for allowing an operation mode to be switched between a normal traveling operation mode and a non-normal traveling operation mode, and includes, for example, an operation button provided on the front surface of the joystick 21. The second to the fourth input operation portions 43 to 45 select the pinwheeling mode, the lateral movement mode, and the normal traveling mode, respectively, and include each operation button provided on the upper surface at the upper end of the joystick 21. Further, for example, when a main power supply of the electric car is turned off, more specifically, when an ignition switch is turned off, the parking mode is selected. Input operation portion for selecting the parking mode may be separately provided, or the parking mode may be selected by combination of the plurality of operation buttons among the input operation portions 42 to 45. At least one of the input operation portions 42 to 45 is not necessarily provided on the joystick 21, and may be provided on, for example, the surface of a dashboard 24.

A control system will be described in conjunction with FIG. 2. In the vehicle, the ECU 31 outputs, to the turning drive source 4a, a turning amount command value having a defined or predetermined ratio for the steering amount signal inputted via the joystick 21, so that the stop control device controls the turning operation of the turning device 4. The ECU 31 and a plurality of inverter devices 39 are provided as control device for controlling the turning devices 4 and the traveling drive mechanisms 5. The respective inverter devices 39 drive the motors 6 serving as the electric motors of the traveling drive mechanisms 5 for the corresponding wheels, and include a power circuit unit such as an inverter to convert DC power of a battery Bt (FIG. 5) to AC power, and a control circuit unit for controlling the power circuit unit according to a command from the ECU 31.

The ECU 31 is an electronic control unit for performing central control and cooperative control of the entire vehicle, and includes a microcomputer, an electronic circuit, and the like. The ECU 31 is general control unit for controlling the turning devices 4 and the traveling drive mechanisms 5. The ECU 31 may include a plurality of ECUs having different functions, and a collection of the plurality of ECUs is described herein as the ECU 31. The ECU 31 is provided with turning control unit 32, drive control unit 33, and the mode switching control unit 34.

The turning control unit 32 includes a normal-state turning control part 32a, a stopped-state turning control part 32b, and turning timing shift part 32c. The normal-state turning control part 32a is configured to output, to the turning drive source 4a of each of the turning devices 4, a turning amount command value defined for the steering amount signal inputted via the joystick 21 serving as the steering input portion. The "steering amount signal" means a signal representing the steering direction and the magnitude of the steering amount. The "turning amount command value" means a command value representing the drive direction and the magnitude of the turning drive amount of the turning drive source 4a. The defined turning amount command value may be freely defined. However, in principle, the turning amount command value may be appropriately defined, for example, by an actual vehicle test or a simulation so as to satisfy a proportional relation in which the turning amount command value increases as the steering amount signal increases.

The turning timing shift part 32c is configured to shift the timing for turning at least one of all the wheels 1, 2 by, for example, several tens of milliseconds to several seconds, relative to the timing for turning the other wheels when the traveling mode switching section 41 switches the mode. To "shift timing" means not to set a turning start time t1 for some of the wheels 1, 2 to be turned equal to a turning start time t2 for the others of the wheels 1, 2 to be turned, but to shift the turning start time t1 relative to the turning start time t2 by, for example, several tens of milliseconds to several seconds as described above. Turning speeds for the wheels 1, 2 to be turned while they are being turned are not made different. An example of the timing shift will be described below. When the mode is switched, a plurality of wheels to be turned are not simultaneously turned, but the timing for turning at least one of the wheels is shifted, whereby a frictional force constantly acts between any of the wheels and a road surface at the time of mode switching.

After the traveling mode switching section 41 has switched the mode, the stopped-state turning control part 32b performs hill hold of the vehicle by the respective turning devices 4 corresponding to one or more wheels 1, 2 to turn the one or more wheels 1, 2 toward the toe-in or toe-out side by an amount greater than the defined turning amount command value from the normal-state turning control part 32a. An example of the wheels to be turned will be described below. Hill hold of the vehicle can be performed due to friction between the road surface and the greatly turned wheels mentioned above.

The drive control unit 33 outputs a drive command such as a torque command to the inverter device 39 for the motor 6 of each of the wheels 1, 2, according to a signal representing the accelerator operation amount inputted via the joystick 21. The signal of the accelerator operation amount includes an acceleration command, a deceleration command, and a speed maintaining command.

The mode switching control unit 34 is configured to switch the traveling mode among the normal traveling mode, the non-normal traveling mode, and the parking mode by a mode switching signal. In this example, the mode switching control unit 34 includes, in addition to the mode switching function, a normal traveling operation mode control part 35, a non-normal operation mode control part 36, and a parking mode control part 37 that are configured to cause the turning control unit 32 and the drive control unit 33 to function according to the respectively corresponding traveling modes. The mode switching control unit 34 and the input operation portions 42 to 45 for mode switching constitute the traveling mode switching section 41.

The normal traveling operation mode control part 35 is configured to cause the turning control unit 32 and the drive control unit 33 to function so as to perform a normal driving operation of the vehicle, that is, to perform a defined basic operation, by signals representing a steering input (the above-described steering amount and turning direction) and an accelerator operation amount from the joystick 21 serving as the turning operation portion and the accelerator operation portion. The basic operation is an operation for causing the normal-state turning control part 32*a* of the turning control unit 32 to provide, in response to an input of the steering direction, a command to turn in the direction indicated by the input, and an operation for causing the drive control unit 33 to provide a drive command according to the accelerator operation amount.

When the mode is switched from the non-normal traveling mode to the normal traveling mode by the traveling mode switching section 41, the turning timing shift part 32*c* shifts the timing for turning at least one of the plurality of wheels to be turned, as described above. Variations of shifting the timing for turning the wheel at the time of mode switching are, for example, as follows. In each mode before mode switching, a parking state in that mode is included. Also in each mode after mode switching, a parking state in that mode is included.

(1) At the mode switching from the normal traveling mode, the parking mode, or the pinwheeling mode to the lateral movement mode:

(1-1) timing for turning the front wheels is shifted relative to timing for turning the rear wheels.

(1-2) timing for turning the left wheels is shifted relative to timing for turning the right wheels.

(2) At the mode switching from the parking mode, the lateral movement mode, or the pinwheeling mode to the normal traveling mode:

(2-1) timing for turning the front wheels is shifted relative to timing for turning the rear wheels.

(2-2) timing for turning the left wheels is shifted relative to timing for turning the right wheels.

The stopped-state turning control part 32*b* of the turning control unit 32 performs hill hold of the vehicle by causing the turning devices 4 to turn one or more wheels 1, 2 toward the toe-in or toe-out side by an amount greater than the turning amount command value from the normal-state turning control part 32*a* as described above, immediately after the mode switching to the normal traveling mode. Thereafter, in the normal traveling mode, the normal traveling operation mode control part 35 causes the normal-state turning control part 32*a* to provide, according to a steering input from the joystick 21, a command to turn in the direction indicated by the input, and causes the drive control unit 33 to provide a drive command according to the accelerator operation amount from the joystick 21.

For example, the stopped-state turning control part 32*b* may perform hill hold of the vehicle by causing the turning devices 4 to turn one or more wheels 1, 2 toward the toe-in or toe-out side by an amount greater than the turning amount command value from the normal-state turning control part 32*a*, immediately after the mode switching from the normal traveling mode to the lateral movement mode. Further, for example, the stopped-state turning control part 32*b* may perform hill hold of the vehicle by causing the turning devices 4 to turn one or more wheels 1, 2 toward the toe-in or toe-out side by an amount greater than the turning amount command value from the normal-state turning control part 32*a*, immediately after the mode switching from the pinwheeling mode to the lateral movement mode. Variations of increasing the steering amount after the mode switching as described above are, for example, as follows. In each mode before mode switching, a parking state in that mode is included. In each example, in a case where a plurality of wheels are to be turned by a normal turning angle+α, the wheels are turned so as not to be parallel to each other.

(1) After the mode switching from the parking mode, the normal traveling mode, or the pinwheeling mode to the lateral movement mode:

(1-1) the front wheels or the rear wheels are turned by the normal turning angle+α.

(1-2) the right wheels or the left wheels are turned by the normal turning angle+α.

(2) After the mode switching from the parking mode, the lateral movement mode, or the pinwheeling mode to the normal traveling mode:

(2-1) the front wheels or the rear wheels are turned by the normal turning angle+α.

(2-2) the right wheels or the left wheels are turned by the normal turning angle+α.

Thereafter, the non-normal operation mode control part 36 causes the drive control unit 33 to provide a drive command according to the accelerator operation amount from the joystick 21 in the lateral movement mode. Even when the input of the steering direction and the input in the accelerator are performed in similar manner on the joystick 21, the turning control unit 32 and the drive control unit 33 perform different operations because of the intervention of the normal traveling operation mode control part 35 and the non-normal operation mode control part 36.

Also at the time of mode switching from the normal traveling mode or the lateral movement mode to the pinwheeling mode by the traveling mode switching section 41, the turning timing shift part 32*c* shifts the timing for turning at least one of the plurality of wheels to be turned, as described above. Thus, unintended rotation of the vehicle can be prevented, and the vehicle can enter the parking state. This is because, when a position of the center of rotation and a position of the center of gravity are different, the vehicle is likely to rotate although the vehicle will not unintendedly move forward or backward. After the mode switching from the normal traveling mode to the pinwheeling mode by the traveling mode switching section 41, and after the mode switching from the lateral movement mode to the pinwheeling mode by the traveling mode switching section 41, the stopped-state turning control part 32*b* performs hill hold control to maintain the parking state.

Figure 5:
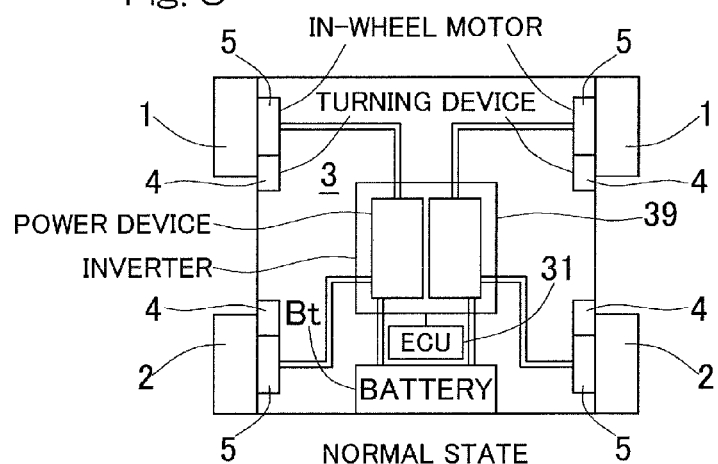
FIG. 5 is an explanatory plan view illustrating a normal state in which turning timing shift part does not perform control for the vehicle.

FIG. 5 is an explanatory plan view illustrating a normal state in which the turning timing shift part 32*c* does not perform control for the vehicle. This will be described in conjunction with FIG. 2. In this example, the traveling mode is set to the normal traveling mode. In the normal traveling mode, a torque for the motors 6 is specified by an operation amount via the joystick 21 moved in the front-rear direction, and a turning angle for the turning devices 4 is specified by an operation amount via the joystick 21 moved in the lateral direction.

Figure 6:
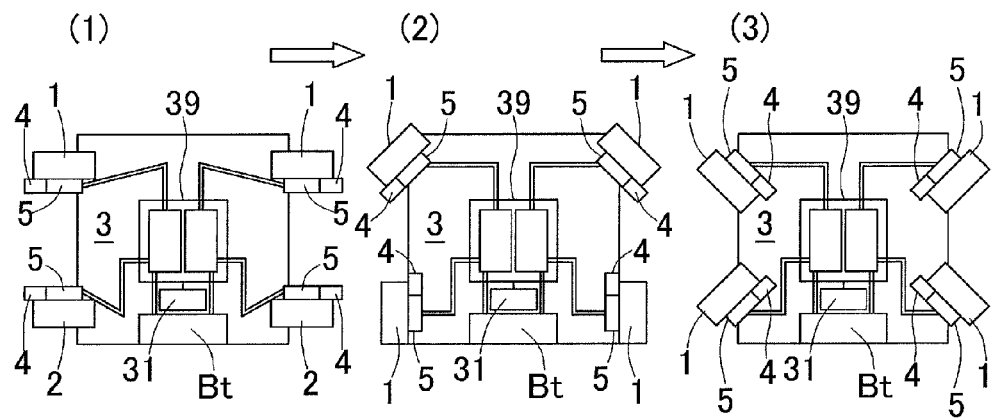
FIG. 6 is an explanatory plan view illustrating a mode-switch example 1 in the vehicle stop control device.

FIG. 6 is an explanatory plan view illustrating a mode-switch example 1 in the vehicle stop control device. This example will be described in conjunction with FIG. 2. This example illustrates switching from the lateral movement mode shown in chart (1) of FIG. 6 to the parking mode shown in chart (3) of FIG. 6 via the position shown in chart (2) of FIG. 6. At the time of mode switching from the lateral movement mode to the parking mode by the traveling mode switching section 41, the turning timing shift part 32c operates the turning devices 4 so as to delay the timing for turning the left and right front wheels 1, 1 relative to the timing for turning the left and right rear wheels 2, 2 (chart (2) of FIG. 6). Thus, at the time of mode switching, the turning timing is shifted such that the front and rear wheels 1, 2 do not become parallel to each other simultaneously, whereby unintended movement of the vehicle on a slope or the like can be prevented. The turning timing is thus shifted, whereby shifting to the parking mode as shown in chart (3) of FIG. 6 is eventually performed.

Operation and effect will be described. The mode is switched among the lateral movement mode, the pinwheeling mode, the normal traveling mode, and the parking mode, by the traveling mode switching section 41. At the time of mode switching by the traveling mode switching section 41, the turning timing shift part 32c shifts the timing for turning at least one of all the wheels 1, 2 relative to the timing for turning the other wheels. At the time of mode switching, the plurality of wheels 1, 2 to be turned are not turned simultaneously, but the timing for turning at least one of the plurality of wheels 1, 2 is shifted, whereby frictional force constantly acts between any of the wheels and a road surface at mode switching. Thus, unintended movement of the vehicle due to disturbance such as an inclination can be prevented.

Other embodiments will be described. In the following description, the components corresponding to the matters described in each of the preceding embodiments are denoted by like reference numerals, and repeated description is not given. When only a part of a configuration is described, the other part of the configuration is the same as described in the preceding description unless otherwise specified. The same operation and effect can be obtained from the same configuration. A combination of parts that are specifically described in the embodiments can be implemented, and, further, the embodiments may be partially combined unless such combinations cause any problem.

Figure 7:
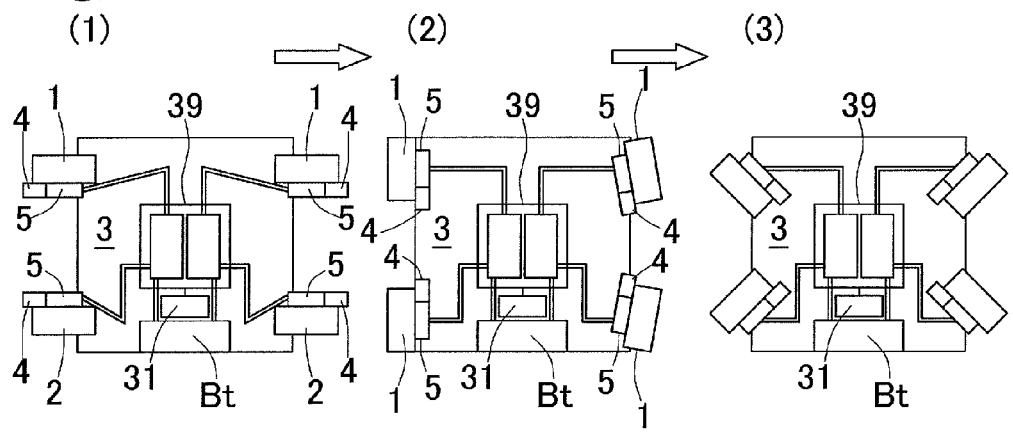
FIG. 7 is an explanatory plan view illustrating a mode-switch example 2 in a vehicle stop control device according to another embodiment of the present invention.

FIG. 7 is an explanatory plan view illustrating a mode-switch example 2 in a vehicle stop control device according to another embodiment. This example will be described in conjunction with the following drawings and FIG. 2. At the time of mode switching from the lateral movement mode to the parking mode by the traveling mode switching section 41, the turning timing shift part 32c operates the turning devices 4 so as to delay the timing for turning the front and rear right wheels 1, 2 relative to the timing for turning the front and rear left wheels 1, 2 (from chart (1) to chart (2) of FIG. 7). Thus, also at the time of mode switching to the parking mode, the turning timing is shifted such that the left and right wheels 1, 2 do not become parallel to each other simultaneously, whereby unintended movement of the vehicle due to disturbance such as an inclination can be prevented. Thereafter, shifting to the parking mode shown in chart (3) of FIG. 7 is performed.

Figure 8:
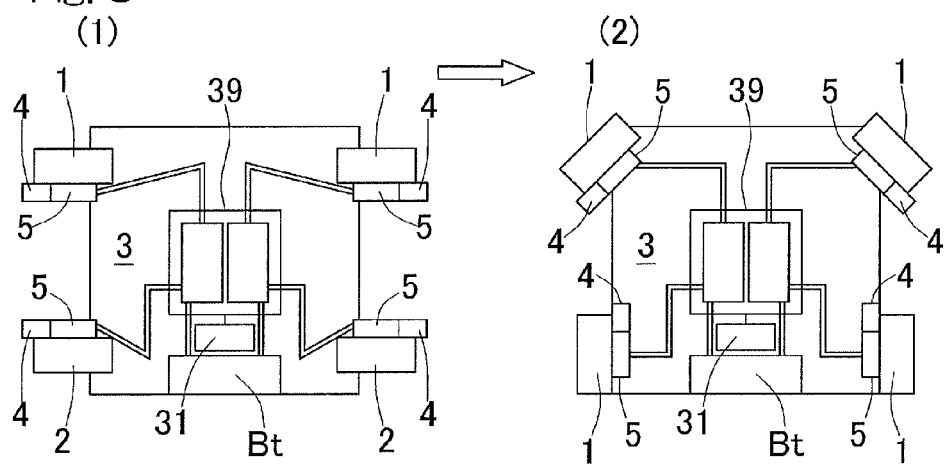
FIG. 8 is an explanatory plan view illustrating a state where only front wheels are turned at a turning angle greater than a normal turning angle, after switching to the normal traveling mode, in a vehicle stop control device according to a further embodiment of the present invention.

As shown in charts (1) and (2) of FIG. 8, after mode switching from the lateral movement mode to the normal traveling mode by the traveling mode switching section 41 (from chart (1) to chart (2) of FIG. 8), the stopped-state turning control part 32b may turn, for example, only the front wheels 1, 1 toward the toe-in side by an amount greater than the defined turning amount command value. A frictional force between the road surface and the turned front wheels 1, 1 can prevent unintended movement of the vehicle.

Figure 9:
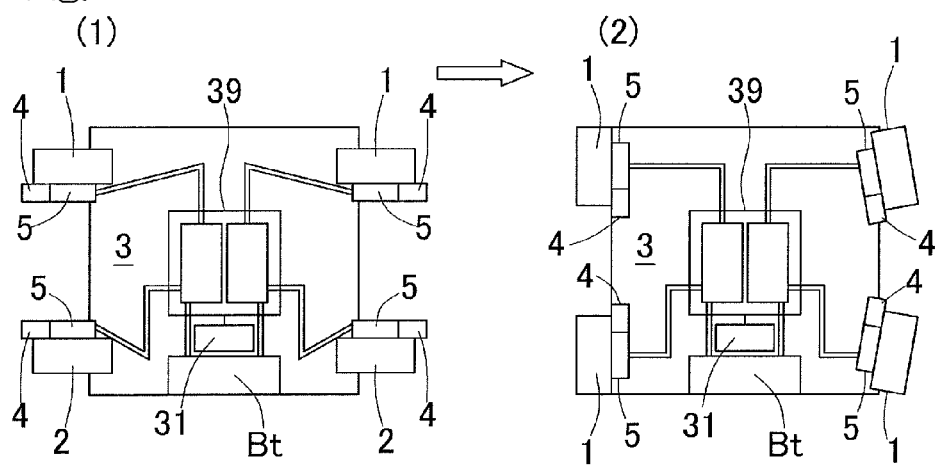
FIG. 9 is an explanatory plan view illustrating a state where only right wheels are turned at a turning angle greater than a normal turning angle, after switching to the normal traveling mode, in a vehicle stop control device according to a still further embodiment of the present invention.

As shown in charts (1) and (2) of FIG. 9, after mode switching from the lateral movement mode to the normal traveling mode by the traveling mode switching section 41 (from chart (1) to chart (2) of FIG. 9), the stopped-state turning control part 32b may, for example, turn the right front wheel 1 toward the toe-in side by an amount greater than the defined turning amount command value, and turn the right rear wheel 2 toward the toe-out side by an amount greater than the defined turning amount command value. Also in this case, a frictional force between the road surface and the turned front and rear right wheels 1, 2 can prevent unintended movement of the vehicle.

Figure 10:
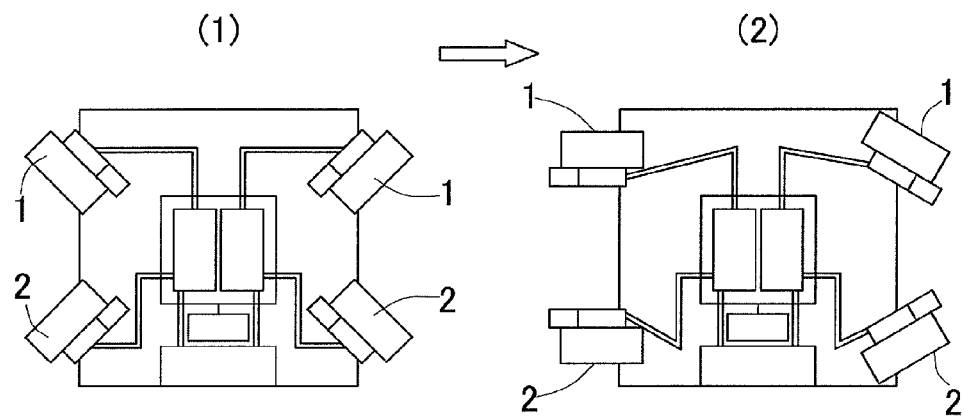
FIG. 10 is an explanatory plan view illustrating a state where only right wheels are turned at a turning angle greater than a normal turning angle, after switching to the lateral movement mode, in a vehicle stop control device according to a yet still further embodiment of the present invention.

At the time of mode switching from the parking mode shown in chart (1) of FIG. 10 to the lateral movement mode, the turning timing shift part 32c shifts, for example, the timing for turning the front and rear left wheels 1, 2 relative to the timing for turning the front and rear right wheels 1, 2 (not shown). After mode switching to the lateral movement mode by the traveling mode switching section 41, the stopped-state turning control part 32b may, for example, turn only the front and rear right wheels 1, 2 by an amount greater than the defined turning amount command value, as shown in chart (2) of FIG. 10. Also in this case, a frictional force between the road surface and the turned front and rear right wheels 1, 2 can prevent unintended movement of the vehicle.

Figure 11:
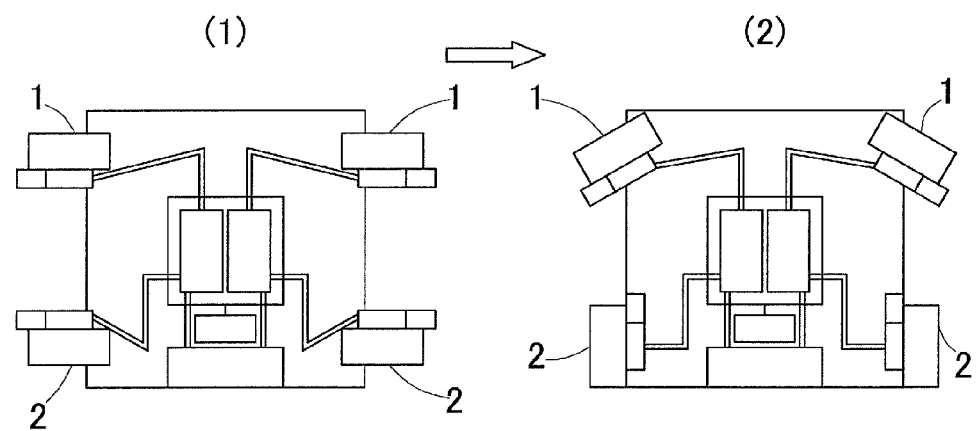
FIG. 11 is an explanatory plan view illustrating a state where only front wheels are turned at a turning angle greater than a normal turning angle, after switching to the normal traveling mode, in a vehicle stop control device according to an even yet still further embodiment of the present invention.

At the time of mode switching from the lateral movement mode shown in chart (1) of FIG. 11 to the normal traveling mode, the turning timing shift part 32c shifts, for example, the timing for turning the left and right rear wheels 2, 2 relative to the timing for turning the left and right front wheels 1, 1 (not shown). After mode switching to the normal traveling mode by the traveling mode switching section 41, the stopped-state turning control part 32b may, for example, turn only the left and right front wheels 1, 1 by an amount greater than the defined turning amount command value, as shown in chart (2) of FIG. 11. Also in this case, a frictional force between the road surface and the turned left and right front wheels 1, 1 can prevent unintended movement of the vehicle.

In each of the above embodiments, while performing hill hold of the vehicle, the stopped-state turning control part 32b may display an indication to that state on a display device of the vehicle. A driver or other passenger can recognize that the vehicle is under hill hold control by seeing information displayed on the display device. The stop control device may be provided with a switch for releasing hill hold of the vehicle performed by the stopped-state turning control part 32b. Alternatively, a configuration without the stopped-state turning control part 32b may be provided. For example, according to the driver's preference or the like, by forcibly releasing hill hold of the vehicle by use of the switch or with the configuration without the stopped-state turning control part 32b, the vehicle can smoothly start without delay after mode switching. The driven wheel may be driven to travel by an onboard drive device including the motor 6.

Although the present invention has been fully described in connection with the preferred embodiments thereof with reference to the accompanying drawings, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included within the scope.

REFERENCE NUMERALS 1, 2 . . . wheel
4 . . . turning device

5 . . . traveling drive mechanism (in-wheel motor drive device)
6 . . . motor
32b . . . stopped-state turning control part
32c . . . turning timing shift part
41 . . . traveling mode switching section

What is claimed is:

1. A vehicle stop control device which performs stop control for a vehicle including four or more wheels and turning devices capable of independent turning of the wheels, the wheels having driven wheels being independently driven to travel by respective traveling drive mechanisms with motors, the vehicle stop control device comprising, as a control mode for selecting operations combined by the turning devices and the traveling drive mechanisms:
   a lateral movement mode in which each wheel is laterally oriented with respect to a front-rear direction of the vehicle, and each driven wheel is rotated so as to roll in a same lateral direction;
   a pinwheeling mode in which the wheels are oriented in a direction along a common circumference, or in a direction along any of circumferences of a plurality of concentric circles, and each driven wheel is rotated in a same direction when seen from a center of a vehicle body;
   a normal traveling mode in which driving operation for normal traveling other than driving operation in the lateral movement mode or the pinwheeling mode is performed; and
   a parking mode in which the vehicle is stopped, the vehicle stop control device further comprising:
   a traveling mode switching section capable of switching between the modes; and
   a turning timing shift part configured to shift timing for turning at least one of all the wheels relative to timing for turning the other ones of all the wheels at a time of mode switching by the traveling mode switching section.

2. The vehicle stop control device as claimed in claim 1, wherein the turning timing shift part shifts timing for turning front ones of the wheels relative to timing for turning rear ones of the wheels.

3. The vehicle stop control device as claimed in claim 1, wherein the turning timing shift part shifts timing for turning front and rear right ones of the wheels relative to timing for turning front and rear left ones of the wheels.

4. The vehicle stop control device as claimed in claim 1, further comprising a stopped-state turning control part configured to, after the mode switching by the traveling mode switching section, cause the turning devices to turn one or more of the wheels toward a toe-in or toe-out side by an amount greater than a defined turning amount command value, to perform hill hold of the vehicle.

5. The vehicle stop control device as claimed in claim 1, wherein each traveling drive mechanism is an in-wheel motor drive device.

* * * * *